United States Patent
Werner-Spatz et al.

(10) Patent No.: US 11,067,461 B2
(45) Date of Patent: Jul. 20, 2021

(54) ASSEMBLY AND METHOD FOR ON-WING THRUST MEASUREMENT OF AIRCRAFT ENGINES

(71) Applicant: LUFTHANSA TECHNIK AG, Hamburg (DE)

(72) Inventors: Christian Werner-Spatz, Hamburg (DE); Malte Blume-Werry, Stapelfeld (DE); Jens Friedrichs, Schwuelper (DE); Marc Bauer, Braunschweig (DE); Detlev Wulff, Braunschweig (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 208 days.

(21) Appl. No.: 16/330,776

(22) PCT Filed: Sep. 7, 2017

(86) PCT No.: PCT/EP2017/072415
§ 371 (c)(1),
(2) Date: Mar. 6, 2019

(87) PCT Pub. No.: WO2018/046575
PCT Pub. Date: Mar. 15, 2018

(65) Prior Publication Data
US 2019/0187014 A1  Jun. 20, 2019

(30) Foreign Application Priority Data
Sep. 7, 2016  (DE) .................... 10 2016 216 931.9

(51) Int. Cl.
*G01L 5/13* (2006.01)
*G01L 1/22* (2006.01)
*G01L 25/00* (2006.01)

(52) U.S. Cl.
CPC ............ *G01L 5/133* (2013.01); *G01L 1/2281* (2013.01); *G01L 25/00* (2013.01)

(58) Field of Classification Search
CPC .............................. G01L 5/133; G01L 1/2281
See application file for complete search history.

(56) References Cited

U.S. PATENT DOCUMENTS

| 4,328,703 A | 5/1982 | McClure et al. |
| 9,593,989 B2 | 3/2017 | Hegenbart et al. |

(Continued)

FOREIGN PATENT DOCUMENTS

| DE | 1120754 B | 12/1961 |
| DE | 102011116975 B3 | 3/2013 |

(Continued)

OTHER PUBLICATIONS

Cheatle, Fundamentals of Test Measurement Instrumentation, Mar. 2006, ISA, Chapter 17 (Year: 2006).*

*Primary Examiner* — Eric S. McCall
*Assistant Examiner* — Timothy P Graves
(74) *Attorney, Agent, or Firm* — Leydig, Voit & Mayer Ltd.

(57) ABSTRACT

A method determines a thrust force of an aircraft engine that is attached to an aircraft by a force transferring element having a strain gauge for determining its strain state and a temperature sensor for measuring a surface temperature of the force transferring element adjacent to the strain gauge. The method includes: determining the surface temperature; determining a strain of the force transferring element; determining the strain state of the force transferring element based on the determined strain and compensating for temperature effects by taking into account the surface temperature, the compensation of the temperature effects taking into account both static and transient influences; and calculating (Continued)

the thrust force of the aircraft engine from the determined strain state.

14 Claims, 1 Drawing Sheet

(56) References Cited

U.S. PATENT DOCUMENTS

| | | | |
|---|---|---|---|
| 2006/0251507 A1* | 11/2006 | Braswell | F01D 17/20 |
| | | | 415/13 |
| 2007/0186687 A1 | 8/2007 | Haaser et al. | |
| 2008/0196508 A1 | 8/2008 | Confield et al. | |
| 2011/0067501 A1 | 3/2011 | Lafont et al. | |
| 2011/0135474 A1* | 6/2011 | Thulke | G01L 1/2281 |
| | | | 416/61 |
| 2013/0311112 A1* | 11/2013 | Hegenbart | G01L 5/133 |
| | | | 702/41 |

FOREIGN PATENT DOCUMENTS

| | | | |
|---|---|---|---|
| GB | 966713 A | 8/1964 | |
| GB | 2338793 A | 12/1999 | |

* cited by examiner

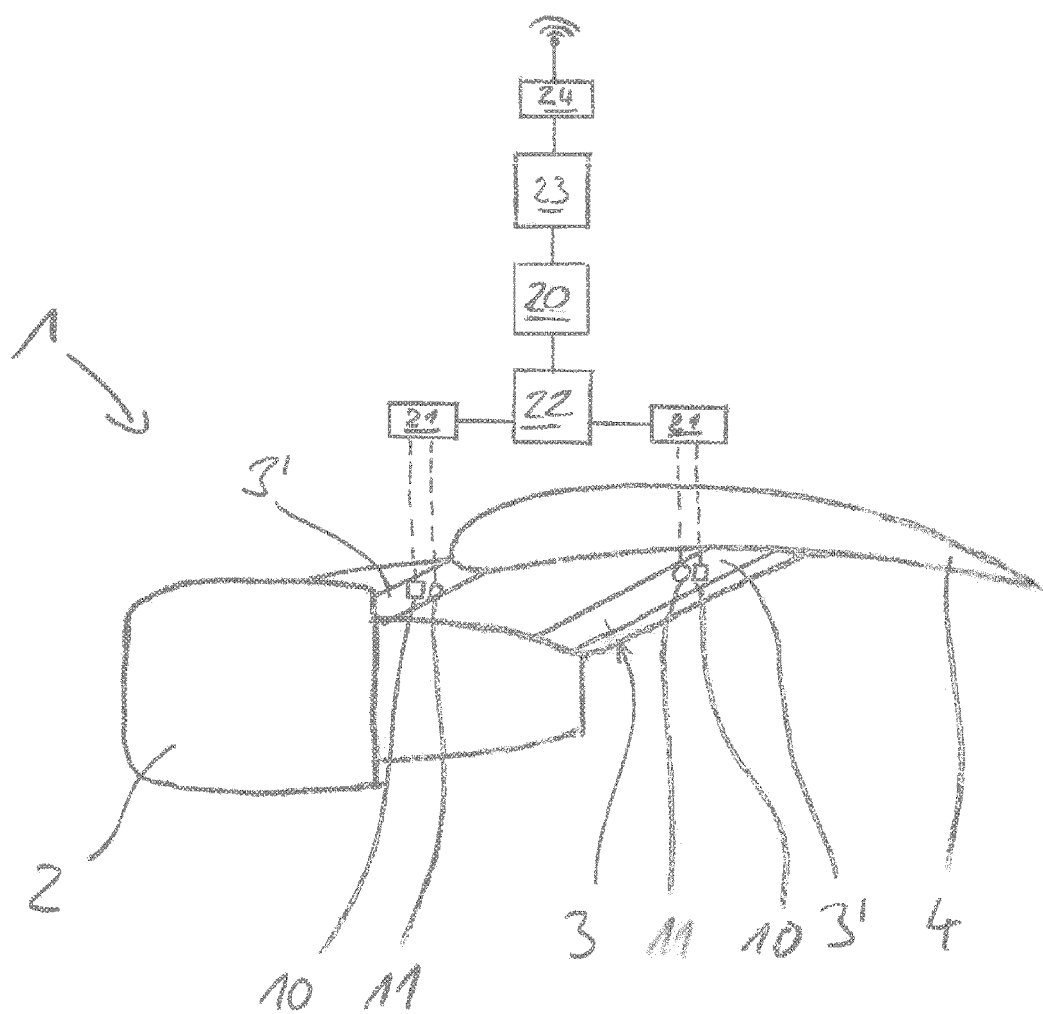

ASSEMBLY AND METHOD FOR ON-WING THRUST MEASUREMENT OF AIRCRAFT ENGINES

CROSS-REFERENCE TO PRIOR APPLICATIONS

This application is a U.S. National Stage Application under 35 U.S.C. § 371 of International Application No. PCT/EP2017/072415 filed on Sep. 7, 2017, and claims benefit to German Patent Application No. DE 10 2016 216 931.9 filed on Sep. 7, 2016. The International Application was published in German on Mar. 15, 2018 as WO 2018/046575 A1 under PCT Article 21(2).

FIELD

The present invention relates to an assembly and a method for on-wing thrust measurement of aircraft engines or jet turbine engines.

BACKGROUND

The net thrust provided by an aircraft engine may be used for tracking the aircraft status of an aircraft for control technology purposes, in particular in relation to the control of the aircraft engine and possibly for the identification of signs of wear that can be used as indications of maintenance and servicing measures that are to be carried out.

For this purpose, the thrust force can be determined by means of substitute variables, such as for example revolution rate and overall pressure ratio, based on thermo-aerodynamic variables and using a calibration previously conducted in test bench tests. For this purpose, thermodynamic variables relating to the cyclic process of the engine are measured during operation of the aircraft engine, and based on this, the supposed thrust force is calculated by means of thermodynamic parameters and specific models of the thrust nozzle (gas generator method), the pulse change of the fluidic throughflow of the engine (EPR or pressure area method) or the fluidic performance of the bypass compressor (NL method). Experimentally determined correction variables, such as for example a nozzle coefficient, and other calibration factors that are intended to represent the difference between a bench test and the situation in the actual flight mode are also included in these calculations. However, the correction variables and calibration factors remain constant during flight, so that variations in the thrust force because of components of an engine outside the cyclic process, for example performance-reducing wear effects on the thrust nozzle or fan rotor, cannot be detected.

The error in thrust force determination according to the above-described method is ±3 to ±5% or more—depending on the measurement method and the calculation method.

A further disadvantage of the above method includes the inability during a flight to be able to trace the cause of any occurring thrust deviations rapidly and sufficiently reliably in order to thereby be able to initiate possible suitable countermeasures. Because suitable analysis options are not available or are only insufficiently available, there is essentially only the option of compensating decreasing thrust by adjusting the amount of fuel.

Because performance-reducing wear effects during flight cannot be monitored according to the state of the art, it is furthermore required to over dimension the aircraft engine or to provide excess thrust so that, even in the case of advanced wear, a specified minimum thrust ("certified thrust") will always be achieved. A suitable over dimensioning usually results in higher costs and greater weight of the engine.

The document DE 20 2011 116 975 B3 proposes a thrust force measurement by means of strain gauges that are externally disposed at suitable points on the structure of an aircraft. For measurement error compensation, a plurality of strain gauges should always be disposed in a bridge circuit, and the plausibility of the determined thrust force should be carried out by separate measurement, in each case with a plurality of strain gauges in a bridge circuit. The relationship between the measured strain and the thrust force can be determined computationally or experimentally in the form of a characteristic curve.

From the documents DE 1 120 754 B, US 2011/0067501 A1 and US 2007/0186687 A1 it is known that with an assembly of a plurality of strain gauges in a suitable bridge circuit measurement errors caused by temperature effects can be reduced. For this purpose, the strain gauges of a bridge circuit must be disposed close together so that they are essentially exposed to the same temperature. According to US 2007/0186687 A1, it is preferable to ensure good thermal conductivity between the component and the strain gauges in order to further reduce possible temperature effects.

SUMMARY

An embodiment of the present invention provides a method that determines a thrust force of an aircraft engine that is attached to an aircraft by a force transferring element having a strain gauge for determining its strain state and a temperature sensor for measuring a surface temperature of the force transferring element adjacent to the strain gauge. The method includes: determining the surface temperature; determining a strain of the force transferring element; determining the strain state of the force transferring element based on the determined strain and compensating for temperature effects by taking into account the surface temperature, the compensation of the temperature effects taking into account both static and transient influences; and calculating the thrust force of the aircraft engine from the determined strain state.

BRIEF DESCRIPTION OF THE DRAWINGS

The present invention will be described in even greater detail below based on the exemplary figure. The invention is not limited to the exemplary embodiments. Other features and advantages of various embodiments of the present invention will become apparent by reading the following detailed description with reference to the attached drawing which illustrates the following:

FIG. 1. shows a schematic representation of an assembly according to the invention.

DETAILED DESCRIPTION

Embodiments of the present invention provide a method and an assembly for on-wing thrust measurement of aircraft engines that is improved compared to the prior art.

Embodiments of the invention include a method for determining the thrust force of an aircraft engine, where the aircraft engine is attached to an aircraft by means of the force transferring elements of an engine mount with a known geometry, the force transferring elements are provided with a number of strain gauges on the surface enabling the determination of the strain state of the force transferring elements, and a number of temperature sensors at least corresponding to the number of strain gauges is provided for the measurement of the surface temperature, where in each case at least one temperature sensor is disposed immediately adjacent to a respective strain gauge, with the steps:

a. determining the temperatures on the surface of the force transferring elements in the region of the strain gauges by the respective temperature sensors that are disposed in the immediate vicinity;

b. determining the strain on the force transferring elements at the points at which strain gauges are provided;

c. determining the strain state of the force transferring elements based on the determined strains during compensation of the temperature effects by taking into account the respective temperature determined in the immediate vicinity of a strain gauge, wherein the compensation of the temperature effects takes into account both static and transient effects; and d. calculating the thrust force of the aircraft engine from the determined strain state.

Furthermore, embodiments of the invention provide an assembly for determining the thrust force of an aircraft engine, where the aircraft engine is attached to an aircraft by means of force transferring elements of an engine mount with a known geometry, where the force transferring elements are provided with a number of strain gauges enabling the determination of the strain state of the force transferring elements, and at least a number of temperature sensors corresponding to the number of strain gauges is provided for measurement of the surface temperature, where in each case a temperature sensor is disposed immediately adjacent to a respective strain gauge, and where the strain gauges and temperature sensors are connected to a detection unit for detecting the measurement results of the strain gauges and temperature sensors, where the detection unit can be connected to an analysis unit that is designed to determine the thrust force of the aircraft engine according to a method according to the invention.

Solely for reasons of clarity, it is assumed in connection with the present invention that an engine mount always includes a plurality of force transferring elements. But the invention expressly also includes engine mounts that only include one force transferring element.

The invention has recognized that using active temperature compensation enables a high accuracy determination of the thrust force of an aircraft engine by externally disposed strain gauges on the engine mount. That is, it has been shown that exclusively passive temperature compensation for thrust force determination of aircraft engines in normal operation, such as can be achieved by suitable bridge circuits for example, does not provide approximately comparably accurate thrust force determination. This is in particular due to the high heat output of the engine and rapid variations in the ambient temperature, for example during take-off and landing. Because of the high heat output of the engine in relatively significantly cooler surroundings, temperature differences that cannot be compensated by passive temperature compensation occur regularly, even with closely adjacently disposed strain gauges. Furthermore, in the event of rapid temperature changes error signals occur with strain gauges that are caused by the temperature response of the strain gauges and that can frequently not be compensated or can only be insufficiently compensated by passive temperature compensation.

The invention has recognized that renouncing passive temperature compensation in favor of active temperature compensation enables for high accuracy of determination of the thrust force of an aircraft engine. With active temperature compensation, with which in each case the temperature is detected in the immediate vicinity of a strain gauge and used for correction of the measurement values, it is possible to compensate static and transient effects resulting from the temperature or a temperature change. In this case, the effects of temperature or temperature change on the measurement result of a strain gauge can be determined computationally or experimentally and the effects determined in this way can be taken into account during the compensation.

It is possible by means of the method according to the invention and the assembly according to the invention to measure the thrust force that is physically transferred between the engine and the aircraft. An erroneous calculation of the thrust force by using auxiliary measurement variables and model calculations with just assumptions of significant influencing variables is thus avoided. Moreover, the direct measurement of the thrust force at the system boundary between the aircraft and the engine gives the possibility of associating thrust-reducing influences directly with the aircraft or the engine. Thus it is for example possible to make a definite distinction between a thrust reduction by a fouled aircraft fuselage and wear effects in the engine itself. Furthermore, in principle the determination of the thrust force is possible in all flight situations and is not limited to such flight situations for which a suitable computer model exists for calculation of the net thrust.

By using the force transferring elements of the engine mount itself, on which according to the invention only surface sensors are to be disposed, as the basis for the thrust measurement, a structural change of the engine mount, which would require extensive aircraft certification, can be omitted. Rather, it is also possible to retrofit an engine mount that is already present and in use such that an assembly according to the invention is made and allows the method according to the invention to be carried out. The geometry of the engine mount requires no adaptation for this. However, it is accurately known, so that a computational determination of the stress state in the engine mount or the force transferring elements thereof is possible based on individual strain measurements on the surface and based on this the thrust force determination.

The determination of the strain state is preferably carried out based on a mechanical calibration, with which the sensitivity of the strain gauges is determined by applying a known test force to the force transferring elements of the engine mount and/or the aircraft engine. In other words, it is determined how individually defined test forces are reflected in the measurement results of the strain gauges, so that a relationship is formed between the measurement results and the size of the test force. In this case, it is particularly preferred if the test forces are exerted directly on an aircraft engine that is mounted on the engine mount, because the force transfer from the aircraft engine to the engine mount can thus be directly taken into account during the mechanical calibration. It is however also possible to carry out the mechanical calibration using a test device in which the engine mount is clamped with the connecting points thereof and with which the loads occurring when using the engine mount in operation can be simulated in a controlled manner.

It is preferable if the compensation takes into account the temperature effects of static influences, which include the temperature-dependent change in the material properties of the material of the force transferring elements of the engine mount in the region of the strain gauges, the temperature response of the strain gauges that are used and/or the change in sensitivity of the strain gauges that are used. Owing to local temperature changes on the surface of the force transferring elements of the engine mount, the behavior of the material of the elements, the measurement variables determined by the strain gauges and the sensitivity thereof change. Because with aircraft there are significant differences in temperature between takeoff and landing at an airport and the cruising altitude as a rule, it is advantageous for the accuracy of determination of the thrust force to take into account the temperature on the surface of the force transferring elements of the engine mount. Because the temperature sensors are disposed near the strain gauges according to the invention, it is possible to determine the temperature sufficiently accurately at the surface of the elements in question at the points at which strain gauges are disposed, which can then be assumed to be the temperature of the respective strain gauge.

It is particularly preferred if the compensation of the temperature effects takes into account transient influences, which include non-uniform heating of the engine mount or the force transferring elements of the engine mount over the cross-section thereof, the variation of the heating of the engine mount or the force transferring elements of the engine mount as a function of the variation with time of the ambient temperature and/or the variation of the temperature response of the strain gauges as a function of the variation of the ambient temperature. It has turned out that taking into account transient temperature effects is advantageous for high accuracy of thrust force determination. The transient temperature effects arise primarily because of rapid changes in ambient temperature, for example during ascent or descent, or because of different temperatures on the surface of the force transferring elements of the engine mount, which can occur because of different incident flow or local temperature increases, for example due to the engine. Taking into account the transient temperature effects is essential in order to be able to conclude the stress state of the engine mount or the force transferring elements of the engine mount very accurately from the measurement values of the strain gauges and from these the thrust force of the engine.

In particular, the factors for the compensation of static and transient temperature effects can be determined during tests on a test bench, which in addition to the application of test forces may also enable adjustment and variation of the ambient temperature for the engine mount. In this case, because of the certification conditions for aircraft and the components thereof it can be assumed that engine mounts of a type are of the same design so that the factors determined for the compensation of static and transient temperature effects for an engine mount also apply to other engine mounts of the same type. In this case, in principle the method according to the invention thus enables an extensive mechanical calibration under laboratory conditions in addition to the temperature calibration. Re-calibration on the engine is not necessary as a rule.

It is however particularly preferred if the mechanical calibration is carried out or at least verified with the aircraft engine fully mounted on the engine mount in order to take into account secondary load paths, for example via hose connections, cable connections or pipe connections from the aircraft to the engine via the engine mounts. Thrust components that are not introduced into the aircraft via the force transferring elements of the engine mount, but simply via secondary load paths from the engine, can be taken into account by suitable compensation.

The strain gauges can preferably include strain gauge strips, preferably in a quarter, half or full bridge arrangement. The strain gauges are preferably disposed on a force transferring element so as to enable detection of the strain state in all spatial directions.

To describe the assembly according to the invention, reference is made to the above embodiments. It is to be noted again that the application of strain gauges and temperature sensors is carried out exclusively on the surface of the force transferring elements of the engine mount and thus aircraft recertification of the engine mount is not necessary.

The detection unit provided according to the invention is in principle disposed on board the aircraft. The analysis unit can also be disposed directly on board the aircraft and permanently connected to the detection unit, so that even a calculation of the thrust force of the aircraft engine may be carried out in real time.

It is however also possible that on board the aircraft the measurement values of the strain gauges and temperature sensors are only detected by the detection unit. The detected measurement values can then be directly transmitted to an analysis unit that is disposed outside the aircraft and that calculates therefrom the thrust force of the aircraft engine. Alternatively, the measurement values can be temporarily stored in a Quick Access Recorder (QAR), to which an analysis unit, which may be mobile for example, can be connected as required, so that the analysis unit calculates the thrust force of the aircraft engine based on the temporarily stored data.

The analysis unit that is provided according to the invention can preferably be disposed on board the aircraft and connected to the Data Management Unit (DMU) of the aircraft. More preferably, the analysis unit can transmit the determined thrust force to the DMU in real time. In other words, the analysis unit regularly provides the DMU with the determined thrust force that is currently being provided by an aircraft engine for further processing and control of the aircraft.

Alternatively, it is possible for the detection unit and/or the data management unit of the aircraft that is connected thereto to be designed to send the determined measurement values via an Aircraft Communication Addressing and Reporting System (ACARS). In particular, together with other data relating to the flying state, the thrust force of the aircraft engine of the aircraft can be determined by a ground-based station including an analysis unit and it may possibly be determined whether, and if so which, repair measures on the aircraft or on an engine are indicated.

The invention will now be described using an advantageous embodiment with reference to the accompanying drawing by way of example.

FIG. 1 is a schematic representation of an assembly 1 according to the invention for determining the thrust force of an aircraft engine 2 of an aircraft. The aircraft engine is joined to the wing 4 by means of an engine mount 3 including force transferring elements 3' and thereby to the aircraft. The geometry of the engine mount 3 including the force transferring elements 3' between the connecting points to the aircraft engine 2 and the wing 4 is known and is moreover identical between the different aircraft of the same type with the same aircraft engines 2.

The assembly 1 includes a total of four strain gauges 10 and four temperature measurement sensors 11, of each of which only two are represented, because the respective other two are disposed on the opposite side of the force transferring elements 3' which is thus not represented in FIG. 1.

The strain gauges 10 each include strain gauge strips in a full bridge arrangement, each enabling a full two-axis determination of the strains on the surface of the force transferring elements of the engine mount 3. Providing four strain gauges 10 enables the strain state of the engine mount 3 to be determined in all spatial directions in principle while taking into account the geometry of the engine mount 3.

The temperature sensors 11 provided are each disposed immediately adjacent to the strain gauges 10. Here too, two of the temperature sensors 11 are again disposed on the side of the force transferring elements 3' of the engine mount 3 that is not represented in FIG. 1. The respective local surface temperature of the force transferring elements 3' can be determined by means of the temperature sensors 11. Because of the immediate juxtaposition to the strain gauges 10, the measured temperatures are also valid for the respective adjacent strain gauge 10.

The strain gauges 10 and the temperature sensors 11 are connected to an analysis unit 20 by means of analog-to-digital converters 21 and a detection unit 22. In this case, the analysis unit 20 is designed to determine the current thrust of the aircraft engine 2 from the measurement data originating from the strain gauges 10 and the temperature sensors 11. For this purpose, the analysis unit 20 carries out the following steps:

a. receiving the temperatures on the surface of the force transferring elements 3' of the engine mount 3 that are determined by the temperature sensors 11;
 b. receiving the measurement values of the strain gauges 10 reflecting the strain on the force transferring elements 3' of the engine mount 3 at the points at which the respective strain gauges 10 are provided;
 c. determination of the strain state of the engine mount 3 in all spatial directions based on the determined strains during compensation of the temperature effects by taking into account the respective temperature that is determined immediately adjacent to a strain gauge 10; and
 d. calculation of the thrust force of the engine from the determined strain state.

In order to be able to derive the strain state of the engine mount 3 from the measurement results of the strain gauges 10 in principle, a previously conducted mechanical calibration of the strain gauges 10 is used.

During the temperature compensation, both static and transient temperature effects are taken into account. The factors used for the corresponding temperature compensation have been previously determined on an equivalent engine mount 3 in a test bench including active air conditioning and can be used for the temperature compensation of an equivalent engine mount 3. The static temperature effects include the temperature-dependent change of the material properties of the material of the engine mount 3 or the force transferring elements 3' in the vicinity of the strain gauges 10, the temperature response of the strain gauges 10 that are used and the change in sensitivity of the strain gauges 10 that are used. The transient temperature effects include the non-uniform heating of the engine mount 3 or the force transferring elements 3' over the cross-section thereof, the variation of the heating of the force transferring elements 3' as a function of the time variation of the ambient temperature and the variation of the temperature response of the strain measurement point 10 as a function of the variation of the ambient temperature.

Owing to the corresponding temperature compensation, an accurate value for the thrust transferred from the aircraft engine 2 to the wing 4 and thereby to the aircraft in any flying state can be determined based on the mechanical calibration. In this case, the actual thrust is determined and not a thrust that is calculated from auxiliary variables based on modelling assumptions.

The thrust determined by the analysis unit 20 is transmitted in real time to the Data Management Unit 23 of the aircraft and is taken into account there during the control of the aircraft. Furthermore, the thrust force determined by the analysis unit 20 is transmitted together with other values regarding the flying state of the aircraft by means of an Aircraft Communication Addressing and Reporting System 24 from the Data Management Unit 23 to a receiver on the ground (not represented), where the information can be analyzed further.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for determining a thrust force of an aircraft engine, wherein the aircraft engine is attached to an aircraft by a force transferring element of an engine mount with a known geometry, the force transferring element is provided with a plurality of strain gauges enabling determination of a strain state of the force transferring element, and a plurality of temperature sensors at least corresponding to the number of strain gauges is provided for measurement of a surface temperature, wherein in each case at least one of the plurality of temperature sensors is disposed adjacent to a respective one of the plurality of strain gauges, the method comprising: determining the surface temperature of the force transferring element in the vicinity of the strain gauges by the respective temperature sensors that are disposed in the immediate vicinity; determining a strain of the force transferring element at points at which the strain gauges are provided; determining the strain state of the force transferring elements based on the determined strain and compensating for temperature effects by taking into account the respective surface temperature determined in the immediate vicinity of the corresponding one of the strain gauges, wherein the compensation of the temperature effects takes into account both static and transient influences based on predetermined influences of temperature and temperature changes, wherein the static influences comprise a temperature response of the strain gauges, and wherein the transient influences comprise at least one of a variation of heating of the force transferring element over a cross-section thereof, a variation of heating of the force transferring element as a function of a variation of the ambient temperature over time, and a variation of the temperature response of the strain gauges as a function of the variation of the ambient temperature over time; and calculating the thrust force of the aircraft engine from the determined strain state.

2. The method according to claim 1, wherein the determination of the strain state is carried out based on a mechanical calibration, during which a sensitivity of the strain gauges is determined by applying a known test force to the engine mount and/or the aircraft engine.

3. The method according to claim 1, wherein a temperature-dependent change of material properties of a material of the force transferring element in the vicinity of the strain gauges, the temperature response of the strain gauges, and/or a change in sensitivity of the strain gauges are taken into account as at least part of the static influences during the compensation of the temperature effects.

4. The method according to claim 1, wherein non-uniform heating of the force transferring element over a cross-section thereof, are taken into account as at least part of the transient influences during the compensation of the temperature effects.

5. The method according to claim 1, wherein the determination of the strain state of the force transferring elements includes a compensation of secondary load paths.

6. The method according to claim 1, wherein the strain gauges comprise strain gauge strips in a quarter, half, or full bridge arrangement.

7. The method according to claim 2, wherein the mechanical calibration is the determination of the strain state carried out is based on is a previously performed mechanical calibration.

8. The method according to claim 1, wherein the transient influences comprise a non-uniform heating of the engine mount over a cross section thereof.

9. The method according to claim 1, wherein the transient influences comprise a variation of a temperature response of a strain measurement point as a function of a variation of the ambient temperature.

10. The method according to claim 1, wherein the force-transferring element comprises a plurality of force-transferring elements.

11. An assembly for determining the thrust force of an aircraft engine, wherein the aircraft engine is fastened to an aircraft by force transferring elements of an engine mount with a known geometry, wherein the force transferring elements are provided with a plurality of strain gauges enabling a determination of a strain state of the force transferring elements, and plurality of temperature sensors at least corresponding to the number of strain gauges is provided for measurement of a surface temperature, wherein each of the temperature sensors is disposed immediately adjacent to a respective one of the strain gauges, wherein the plurality of strain gauges and the plurality of temperature sensors are connected to a detector configured to detect measurement results of the strain gauges and the temperature sensors, wherein the detector is connectable to an analysis unit that is configured to determine the thrust force of the aircraft engine by: determining the surface temperature of the force transferring elements in the vicinity of the strain gauges by the respective temperature sensors that are disposed in the immediate vicinity; determining a strain of the force transferring elements at points at which that the strain gauges are provided; determining the strain state of the force transferring elements based on the determined strain and compensating for temperature effects by taking into account the respective surface temperature determined in the immediate vicinity of the corresponding one of the strain gauges, wherein the compensation of the temperature effects takes into account both static and transient influences based on predetermined influences of temperature and temperature changes, wherein the static influences comprise a temperature response of the strain gauges, and wherein the transient influences comprise at least one of heating of the engine mount or the force-transferring elements over a cross-section thereof, and a variation of a temperature response of a strain gauge or a strain measurement point as a function of a variation of the ambient temperature over time; and calculating the thrust force of the aircraft engine from the determined strain state.

12. The assembly according to claim 11, wherein the strain gauges comprise strain gauge strips in a quarter, half, or full bridge arrangement.

13. The assembly according to claim 11, wherein the analysis unit is connected to a Data Management Unit of the aircraft and the determined thrust force is transmitted to the Data Management Unit in real time.

14. The assembly according to claim 11, wherein the detection unit and/or the Data Management Unit of the aircraft that is connected thereto are designed to send the determined measurement results by means of an Aircraft Communication Addressing and Reporting System.

* * * * *